United States Patent
Katoh et al.

(10) Patent No.: US 10,811,860 B2
(45) Date of Patent: Oct. 20, 2020

(54) WIRE HARNESS AND POWER SUPPLY DEVICE HAVING THE SAME

(71) Applicant: Yazaki Corporation, Tokyo (JP)

(72) Inventors: Mitsunobu Katoh, Makinohara (JP); Masaki Yokoyama, Makinohara (JP); Tsukasa Sekino, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/420,545

(22) Filed: May 23, 2019

(65) Prior Publication Data

US 2020/0006931 A1  Jan. 2, 2020

(30) Foreign Application Priority Data

Jun. 27, 2018 (JP) .................................. 2018-121813

(51) Int. Cl.
| | |
|---|---|
| *H02G 11/00* | (2006.01) |
| *B60J 5/06* | (2006.01) |
| *B60R 16/02* | (2006.01) |
| *H02G 3/04* | (2006.01) |

(52) U.S. Cl.
CPC ................ *H02G 11/00* (2013.01); *B60J 5/06* (2013.01); *B60R 16/0207* (2013.01); *H02G 3/0456* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,197,954 | A | * | 8/1965 | Herbert | B66C 13/12 |
| | | | | | 59/78.1 |
| 3,473,769 | A | * | 10/1969 | James | F16G 13/16 |
| | | | | | 248/69 |
| 5,836,148 | A | * | 11/1998 | Fukao | F16G 13/16 |
| | | | | | 59/78.1 |

(Continued)

FOREIGN PATENT DOCUMENTS

| | | |
|---|---|---|
| JP | 2009-183013 A | 8/2009 |
| JP | 2017-192258 A | 10/2017 |
| JP | 2017-192259 A | 10/2017 |

*Primary Examiner* — Binh B Tran
*Assistant Examiner* — Krystal Robinson
(74) *Attorney, Agent, or Firm* — Sughrue Mion, PLLC

(57) ABSTRACT

A wire harness includes electric wires, a curvature restricting member and an exterior member. The curvature restricting member includes a strip-like connecting portion and a plurality of pieces and is capable of being curved in orientation that the connecting portion is arranged inside and the pieces are arranged outside. In an inverse orientation, curvature of the curvature restricting member is limited by adjacent pieces abutted onto each other. The curvature restricting member is oriented such that a width direction of the connecting portion is a vertical direction and the connecting portion is positioned outside in a vehicle width direction with respect to the pieces when a sliding door is fully-closed. The connecting portion includes a portion with high flexibility and a portion with low flexibility, and a portion in vicinity of the sliding door has higher flexibility than a portion at a first end side of the curvature restricting member.

3 Claims, 5 Drawing Sheets

(56) References Cited

U.S. PATENT DOCUMENTS

| | | | | |
|---|---|---|---|---|
| 6,065,278 | A * | 5/2000 | Weber | H02G 11/006 59/78.1 |
| 6,189,406 | B1 * | 2/2001 | Kapes | E05B 79/20 29/434 |
| 6,199,322 | B1 * | 3/2001 | Itami | E05F 15/638 192/12 B |
| 6,459,037 | B2 * | 10/2002 | Muller | H02G 11/006 174/19 |
| 6,494,523 | B2 * | 12/2002 | Kobayashi | B60R 16/0207 174/113 R |
| 6,515,229 | B2 * | 2/2003 | Aoki | B60R 16/0215 174/69 |
| 6,550,232 | B1 * | 4/2003 | Achs | F16G 13/16 248/49 |
| 6,575,760 | B2 * | 6/2003 | Doshita | B60R 16/027 174/72 A |
| 6,595,473 | B2 * | 7/2003 | Aoki | F16L 3/10 138/108 |
| 6,830,225 | B2 * | 12/2004 | Kato | H02G 3/0487 248/49 |
| 6,858,797 | B2 * | 2/2005 | Sheikholeslami | F16G 13/16 174/480 |
| 6,984,782 | B2 * | 1/2006 | Ikeda | H02G 11/006 174/21 JS |
| 7,151,224 | B2 * | 12/2006 | Kogure | B60R 16/0215 174/72 A |
| 7,418,812 | B2 * | 9/2008 | Ikeda | F16G 13/16 248/49 |
| 10,047,825 | B2 * | 8/2018 | Komiya | H02G 11/006 |
| 10,367,339 | B2 * | 7/2019 | Galetti | H02G 11/006 |
| 2001/0025715 | A1 * | 10/2001 | Muller | F16L 3/26 174/19 |
| 2004/0026109 | A1 * | 2/2004 | Suzuki | H02G 11/00 174/72 B |
| 2004/0090159 | A1 * | 5/2004 | Tsutsumi | H02G 11/006 312/330.1 |
| 2004/0112625 | A1 * | 6/2004 | Sheikholeslami | F16G 13/16 174/68.1 |
| 2005/0155338 | A1 * | 7/2005 | Wehler | H02G 11/006 59/78.1 |
| 2006/0254797 | A1 * | 11/2006 | Charara | B60R 16/0207 174/72 A |
| 2006/0267380 | A1 * | 11/2006 | Gotou | H02G 3/0475 296/192 |
| 2009/0039196 | A1 * | 2/2009 | Komiya | F16G 13/16 242/615.4 |
| 2009/0140107 | A1 * | 6/2009 | Murayama | B60R 16/0215 248/60 |
| 2014/0238740 | A1 * | 8/2014 | Inoue | H02G 11/006 174/72 A |
| 2016/0185308 | A1 | 6/2016 | Sekino et al. | |
| 2017/0297514 | A1 | 10/2017 | Sekino et al. | |
| 2017/0297515 | A1 | 10/2017 | Sekino et al. | |

* cited by examiner

WIRE HARNESS AND POWER SUPPLY DEVICE HAVING THE SAME

TECHNICAL FIELD

The present invention relates to a wire harness mounted on a motor vehicle and configured to supply power and/or transmit a signal from a vehicle body to an electric component on a sliding door.

BACKGROUND

Conventionally, a motor vehicle having a sliding door is mounted with a power supply device configured to supply power and/or transmit a signal from a vehicle body to an electric component on the sliding door. FIG. 6 is an illustration illustrating a trajectory of a wire harness of a conventional power supply device (for example, refer to Patent Documents 1 and 2 listed below).

A power supply device 401 shown in FIG. 6 includes a wire harness 404 wired from a vehicle body to a sliding door, a body-side unit 402 and a door-side unit 403. The body-side unit 402 supports a corrugated tube 51 as an exterior member of the wire harness 404 on the vehicle body side such that the corrugated tube 51 is rotatable around an axis line P1. The door-side unit 403 supports the corrugated tube 51 on the sliding door side such that the corrugated tube 51 is rotatable around an axis line P2. In FIG. 6, an arrow X is parallel to a width direction of a vehicle, an arrow Y is parallel to a front-rear direction of the vehicle, and an arrow Z is parallel to a vertical direction of the vehicle.

In FIG. 6, the door-side unit in a fully-closed state of the sliding door is denoted by a reference sign 403A, and the wire harness in the fully-closed state of the sliding door is denoted by a reference sign 404A. Further, the door-side unit in the beginning of opening of the sliding door is denoted by a reference sign 403B, and the wire harness in the beginning of opening of the sliding door is denoted by a reference sign 404B. Further, the door-side unit in a half-opened state of the sliding door is denoted by a reference sign 403C, and the wire harness in the half-opened state of the sliding door is denoted by a reference sign 404C. Further, the door-side unit in a fully-opened state of the sliding door is denoted by a reference sign 403D, and the wire harness in the fully-opened state of the sliding door is denoted by a reference sign 404D.

In this power supply device 401, there is a problem that the wire harness 404 curved due to the opening and closing of the sliding door is swelled to the vehicle body side, and this swelling of the wire harness needs to be prevented. This is because if the wire harness 404 is swelled to the vehicle body side, then the wire harness 404 is more likely to interfere with the vehicle body and/or appearance is deteriorated. To address this problem, the power supply device 401 includes a curvature restricting member that is inserted in the corrugated tube 51 and/or includes a spring arranged in the body-side unit 402 and the door-side unit 403. As such, as shown in FIG. 6, for the wire harness 404C in the half-opened state of the sliding door, a portion of the wire harness 404C in the vicinity of the body-side unit 402 extends in the front-rear direction of the vehicle and is prevented from swelling to the vehicle body side.

PRIOR ART DOCUMENT

Patent Document

Patent Document 1: JP 2017-192258 A
Patent Document 2: JP 2017-192259 A

SUMMARY OF THE INVENTION

Problem to be Solved

As described above, in the conventional power supply device 401, the wire harness 404C in the half-opened state of the sliding door is prevented from swelling to the vehicle body side. On the other side, however, swelling of the wire harness 404B in the beginning of the opening of the sliding door (that is a portion G in FIG. 6) is not prevented.

In view of the above-described problem, an object of the present invention is to prevent a wire harness from swelling to a vehicle body side in the beginning of opening of a sliding door.

Solution to Problem

In order to achieve the above-described object, the present invention provides a wire harness to be wired from a vehicle body to a sliding door of a motor vehicle, including an electric wire and a curvature restricting member, wherein the curvature restricting member includes a connecting portion extending in a strip-like fashion in a length direction of the electric wire, and a plurality of pieces upwardly extending from one widthwise end or both widthwise ends of the connecting portion and arranged in a length direction of the connecting portion, the curvature restricting member is capable of being curved in an orientation in which the connecting portion is arranged inside and the pieces are arranged outside, and in an inverse orientation, curvature of the curvature restricting member is limited by adjacent pieces being abutted onto each other, and the connecting portion includes a portion with high flexibility and a portion with low flexibility, in which a portion in vicinity of the sliding door has high flexibility.

Advantageous Effect of the Invention

According to the present invention, the connecting portion has the portion with high flexibility and the portion with low flexibility, and the portion in the vicinity of the sliding door has high flexibility. Thus, rigidity of the portion of the wire harness in the vicinity of the sliding door can be made smaller compared to the other portion of the wire harness, thereby preventing the wire harness from swelling to the vehicle body side in the beginning of the sliding door.

DETAILED DESCRIPTION OF THE EXEMPLARY EMBODIMENTS

In the following, "wire harness" and "power supply device" according to one embodiment of the present invention will be explained with reference to FIGS. 1 to 5.

Figure 1:
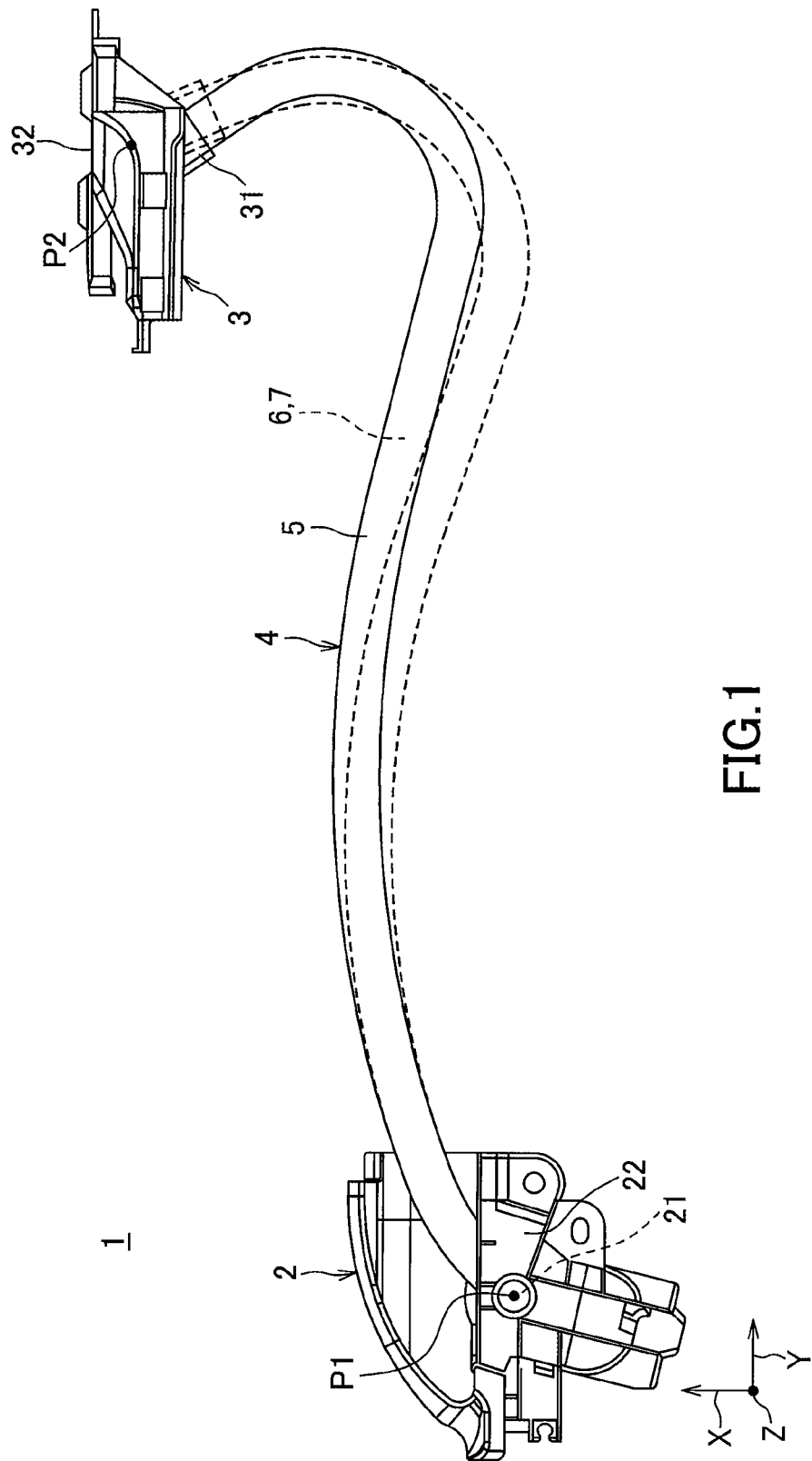
FIG. 1 is a plan view of a power supply device according to one embodiment of the present invention.

A power supply device 1 shown in FIG. 1 is configured to be mounted on a motor vehicle and configured to supply power and/or transmit a signal from a vehicle body to an electric component on a sliding door. The power supply device 1 includes a wire harness 4 to be wired from the vehicle body to the sliding door, a body-side unit 2 rotatably supporting an exterior member 5 of the wire harness 4 on the vehicle body side, and a door-side unit 3 rotatably supporting the exterior member 5 on the sliding door side.

Figure 6:
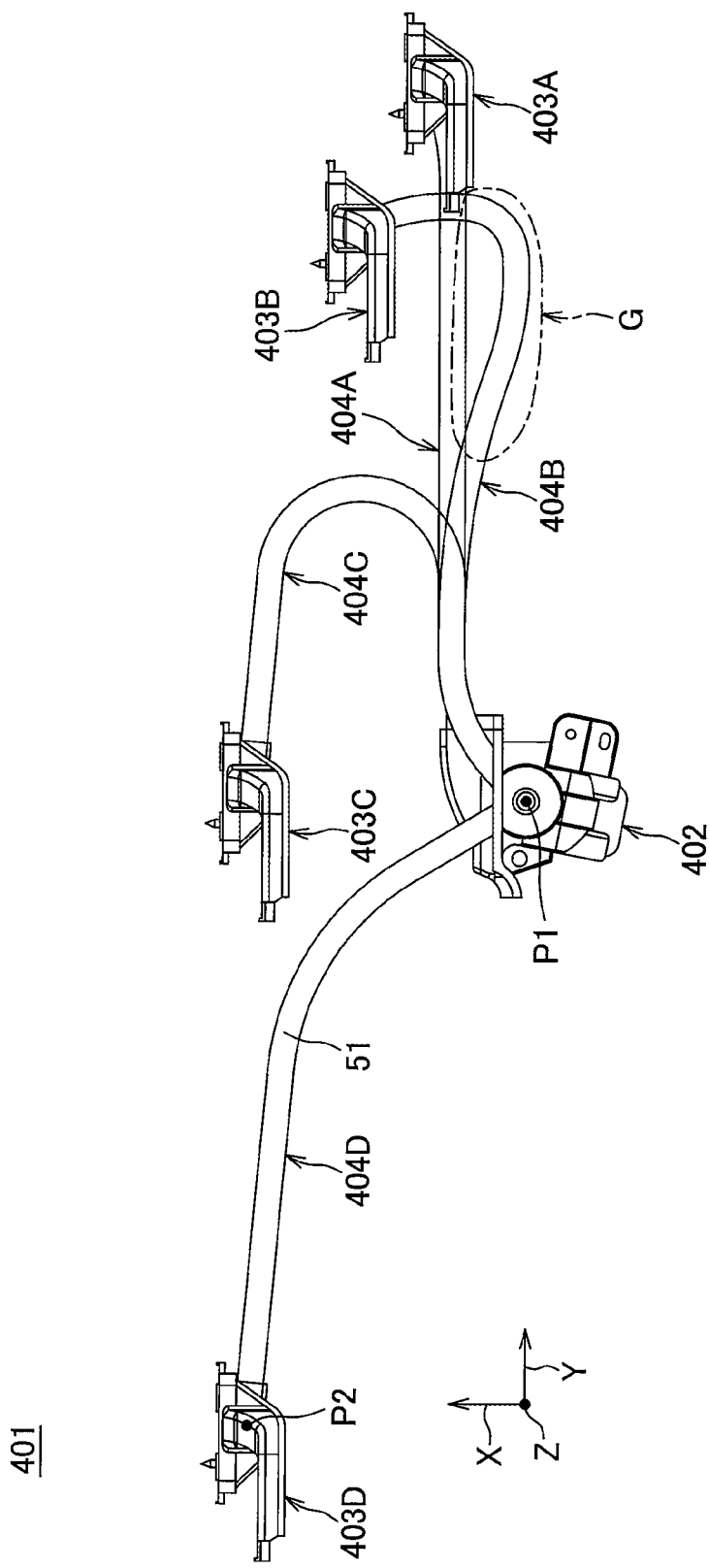
FIG. 6 is an illustration illustrating a trajectory of a wire harness of a conventional power supply device.

FIG. 1 illustrates a form of the power supply device 1 in the beginning of opening of the sliding door, in which a relative position of the body-side unit 2 and the door-side unit 3 corresponds to a relative position of the body-side unit 402 and the door-side unit 403B of the conventional power supply device 4 in FIG. 6. A trajectory of the door-side unit 3 from a fully-closed state of the sliding door to a fully-opened state of the sliding door is the same as the conventional example of FIG. 6. Further, a trajectory of the wire harness 4 from the fully-closed state of the sliding door to the fully-opened state of the sliding door is substantially the same as the conventional example of FIG. 6, except for the beginning of the opening of the sliding door that is shown in FIG. 1. In FIG. 1, an arrow X is parallel to a width direction of the vehicle, an arrow Y is parallel to a front-rear direction of the vehicle, and an arrow Z is parallel to a vertical direction of the vehicle. The sliding door is configured to slide in the front-rear direction of the vehicle.

Figure 2:
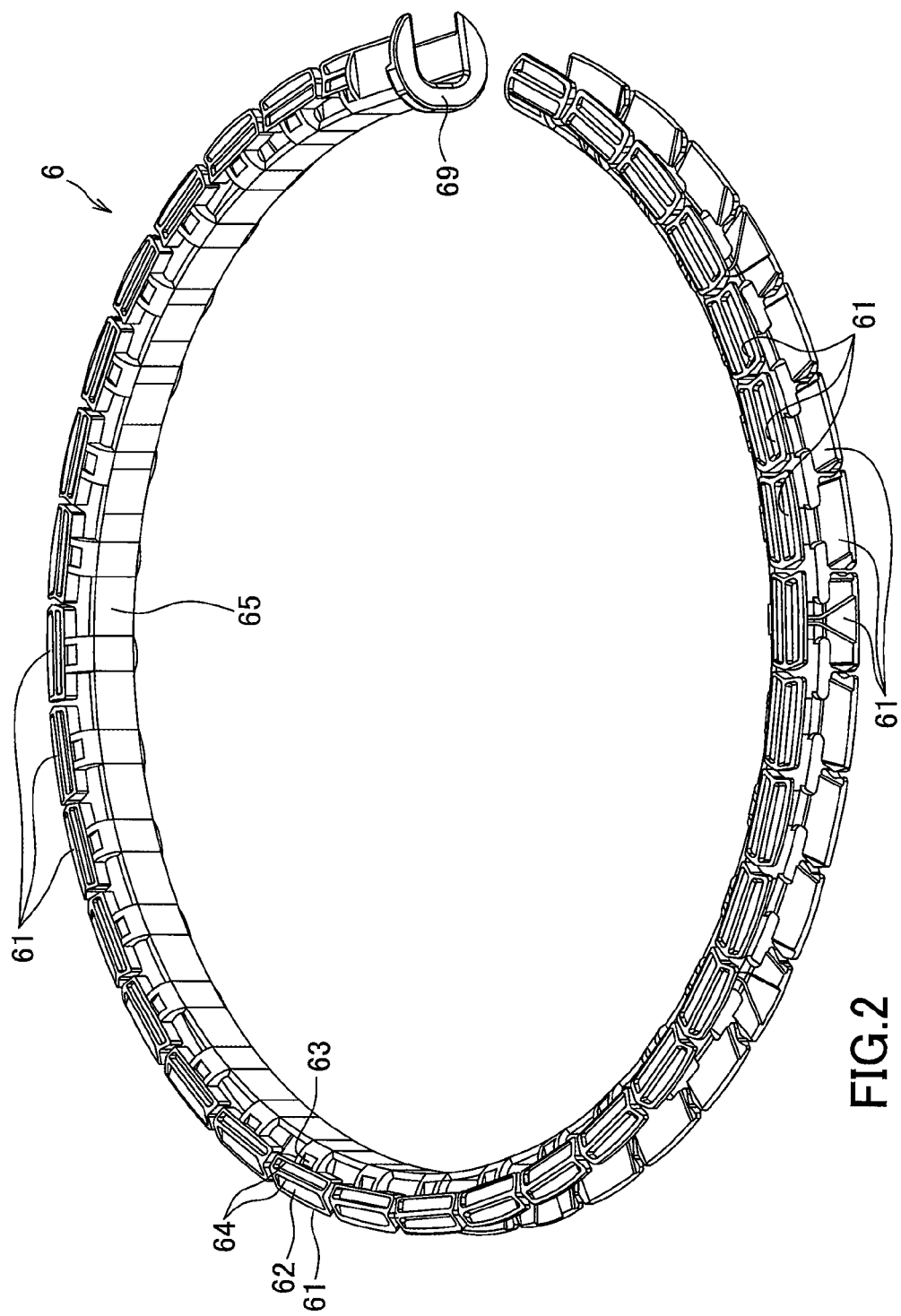
FIG. 2 is a perspective view of a curvature restricting member constituting a wire harness of FIG. 1.
Figure 3:
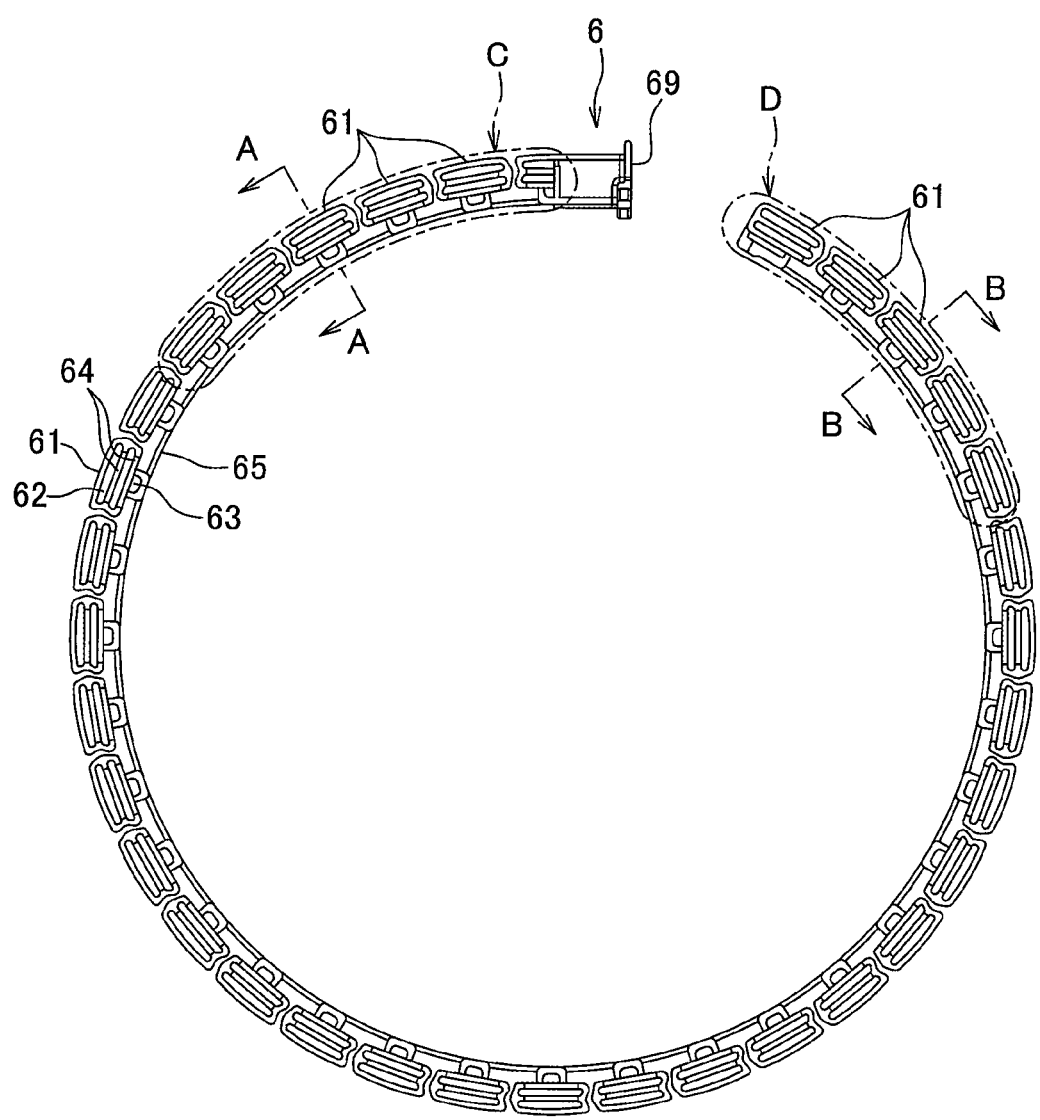
FIG. 3 is a side view of the curvature restricting member of FIG. 2.

The wire harness 4 includes a plurality of electric wires 7, a curvature restricting member 6 shown in FIGS. 2 and 3, and the exterior member 5 covering the electric wires 7 and the curvature restricting member 6. The exterior member 5 and the curvature restricting member 6 are provided in a range from the body-side unit 2 to the door-side unit 3. The electric wire 7 is formed longer than the exterior member 5, and both ends of the electric wires 7 are drawn out from the exterior member 5 and are exposed. As the exterior member 5, a known corrugated tube formed into a concertina tube-like shape may be used.

The curvature restricting member 6 includes a connecting portion 65 extending in a strip-like fashion in a length direction of the electric wire 7, and a plurality of pieces 61 upwardly extending from both widthwise ends of the connecting portion 65 and arranged in a length direction of the connecting portion 65. The connecting portion 65 and the plurality of pieces 61 are integrally formed using synthetic resin. A first end of the curvature restricting member 6 in the length direction is provided with a flange 69 held by the body-side unit 2. A second end of the curvature restricting member 6 in the length direction is a free end which is not held by the door-side unit 3.

Each piece 61 includes a plate portion 62 formed into a rectangular plate-like shape, and a neck portion 63 projecting from an outer edge of the plate portion 62. An outer surface of the plate portion 62 is provided with a reinforcement rib 64. The neck portion 63 is a portion of the piece 61 that is connected to the connecting portion 65 and has a width smaller than that of the plate portion 62.

As shown in FIGS. 2 and 3, the curvature restricting member 6 is capable of being curved in an orientation in which the connecting portion 65 is arranged inside and the pieces 61 are arranged outside, with the adjacent pieces 61 separating away from each other while the connecting portion 65 being elastically deformed. In an inverse orientation, curvature of the curvature restricting member 6 is limited by the plate portions 62 of the adjacent pieces 61 being abutted onto each other. Further, the first end side (i.e., the body-side unit 2 side) of the curvature restricting member 6 is arranged such that a gap exists between the adjacent plate portions 62 when the connecting portion 65 is positioned in a straight line, and the remaining portion of the curvature restricting member 6 is arranged such that the adjacent plate portions 62 abut onto each other when the connecting portion 65 is positioned in a straight line. Thus, the first end side of the curvature restricting member 6 is capable of being slightly curved in an orientation in which the connecting portion 65 is arranged outside and the pieces 61 are arranged inside.

The curvature restricting member 6 is arranged in an orientation in which the width direction of the connecting portion 65 corresponds to the Z direction of FIG. 1 and the connecting portion 65 is positioned outside in the vehicle width direction with respect to the pieces 61 in the fully-closed state of the sliding door. The electric wires 7 are positioned between the pieces 61 arranged opposed to each other in the width direction of the connecting portion 65.

Figure 4:
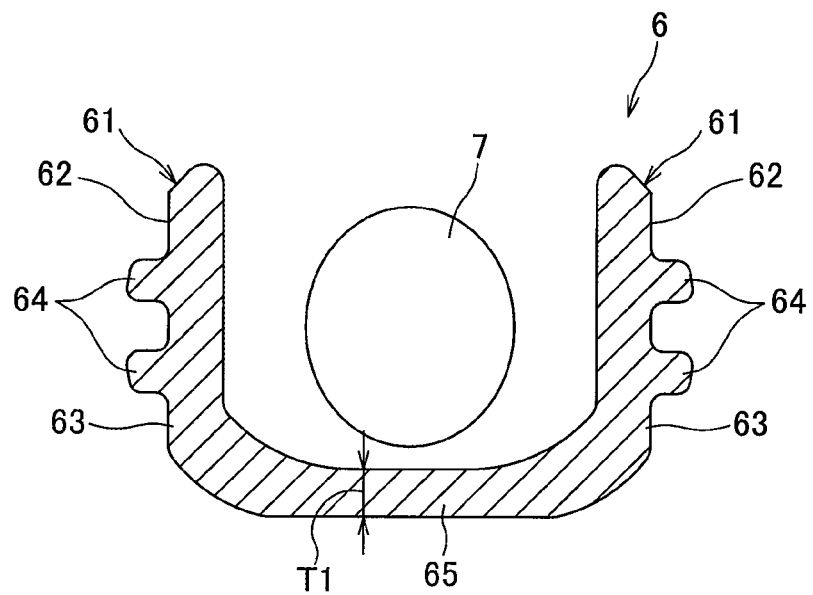
FIG. 4 is a cross-sectional view taken along a line A-A in FIG. 3.
Figure 5:
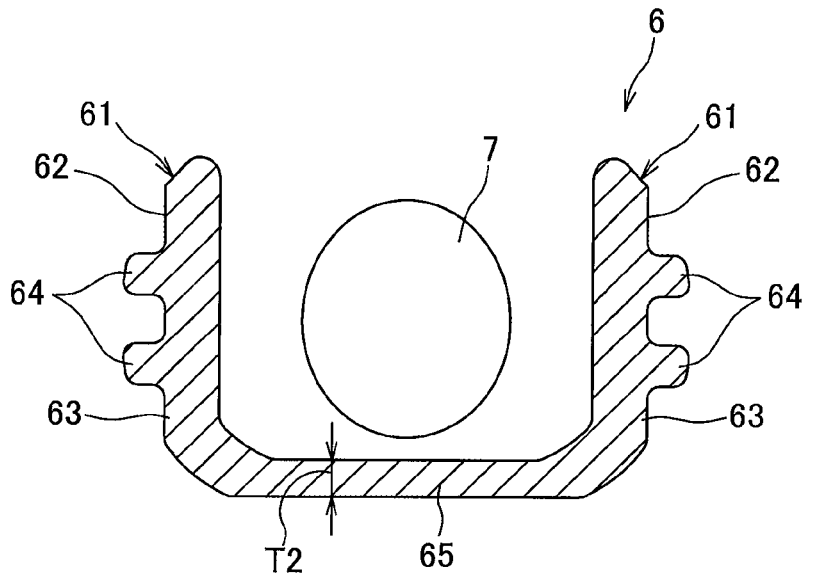
FIG. 5 is a cross-sectional view taken along a line B-B in FIG. 3.

Furthermore, the connecting portion 65 includes a portion with high flexibility and a portion with low flexibility, in which a portion in the vicinity of the sliding door has high flexibility. Specifically, in the connecting portion 65, a portion D shown in FIG. 3 located at the second end side in the length direction of the curvature restricting member 6 has flexibility higher than a portion C located at the first end side of the curvature restricting member 6. Further, in this example, as shown in FIGS. 4 and 5, a thickness T2 of the connecting portion 65 in the portion D is made thinner than a thickness T1 of the connecting portion 65 in the portion C, thereby increasing the flexibility of the connecting portion 65 in the portion D compared to the connecting portion 65 in the portion C. Further, in this example, the length of the connecting portion 65 in the portion D corresponds to about 20% of an entire length of the curvature restricting member 6.

The body-side unit 2 includes a body rotor 21 attached to a first end of the exterior member 5, and a body protector 22 which is fixed to the vehicle body and to which the body rotor 21 is attached so as to rotate around an axis line P1.

The door-side unit 3 includes a door rotor 31 attached to a second end of the exterior member 5, a door protector 32 which is fixed to the sliding door and to which the door rotor 31 is attached so as to rotate around an axis line P2, and a spring configured to bias the door rotor 31 in the counter-clockwise direction in a plan view of FIG. 1.

In the power supply device 1, since the wire harness 4 includes the curvature restricting member 6 described above, rigidity of the portion of the wire harness 4 in the vicinity of the door-side unit 3 can be made smaller compared to the other portion of the wire harness 4, thereby preventing the wire harness from swelling to the vehicle body side in the beginning of opening of the sliding door. Consequently, interference between the wire harness 4 and the vehicle body can be prevented, and also, deterioration of appearance due to the swelling of the wire harness 4 can be avoided.

In FIG. 1, a dotted line indicates a wire harness of a comparative example. In the wire harness of this comparative example, a curvature restricting member includes a connecting portion 65 having the flexibility that is uniform across the entire length thereof. As can be seen from FIG. 1, by using the curvature restricting member 6 of this embodiment, the swelling of the wire harness 4 in the beginning of opening of the sliding door can be reduced.

Although the wire harness 4 of the above-described embodiment includes the exterior member 5, the wire harness of the present invention may not necessarily include the exterior member. Further, although the curvature restricting member 6 of the above-described embodiment includes the pieces 61 extending upwardly from the both widthwise ends of the connecting portion 65, the curvature restricting member of the present invention may include the pieces 61 extending upwardly from only one widthwise end of the connecting portion 65.

The embodiments described above are only representative embodiments of the present invention, and the present invention is not limited to these. That is, various modifications may be made and implemented without departing from the scope of the present invention, and are within the scope of the present invention as long as they include the configuration of the present invention.

LIST OF REFERENCE SIGNS 1 power supply device
2 body-side unit
3 door-side unit
4 wire harness
5 exterior member
6 curvature restricting member
7 electric wire
61 piece
65 connecting portion

What is claimed is:

1. A wire harness to be wired from a vehicle body to a sliding door of a motor vehicle, comprising:
   an electric wire; and
   a curvature restricting member, wherein
   the curvature restricting member includes a connecting portion extending in an elongated fashion in a length direction of the electric wire, and a plurality of pieces upwardly extending from one widthwise end or both widthwise ends of the connecting portion and arranged in a length direction of the connecting portion,
   the curvature restricting member is configured to be curved in an orientation in which the connecting portion is arranged inside and the pieces are arranged outside, and in an inverse orientation, curvature of the curvature restricting member is limited by adjacent pieces being abutted onto each other, and
   the connecting portion includes a first portion and a second portion, the second portion having flexibility higher than flexibility of the first portion, the first portion be positioned at a first end area of the curvature restricting member and the second portion being located at a second end area of the curvature restricting member in vicinity of the sliding door,
   wherein the second portion of the connecting portion has a thickness thinner than the first portion.

2. The wire harness according to claim 1, further comprising an exterior member covering the electric wire and the curvature restricting member.

3. A power supply device comprising:
   the wire harness according to claim 1;
   a body-side unit rotatably supporting the wire harness on a vehicle body side; and
   a door-side unit rotatably supporting the wire harness on a sliding door side.

* * * * *